United States Patent Office 2,753,735
Patented July 10, 1956

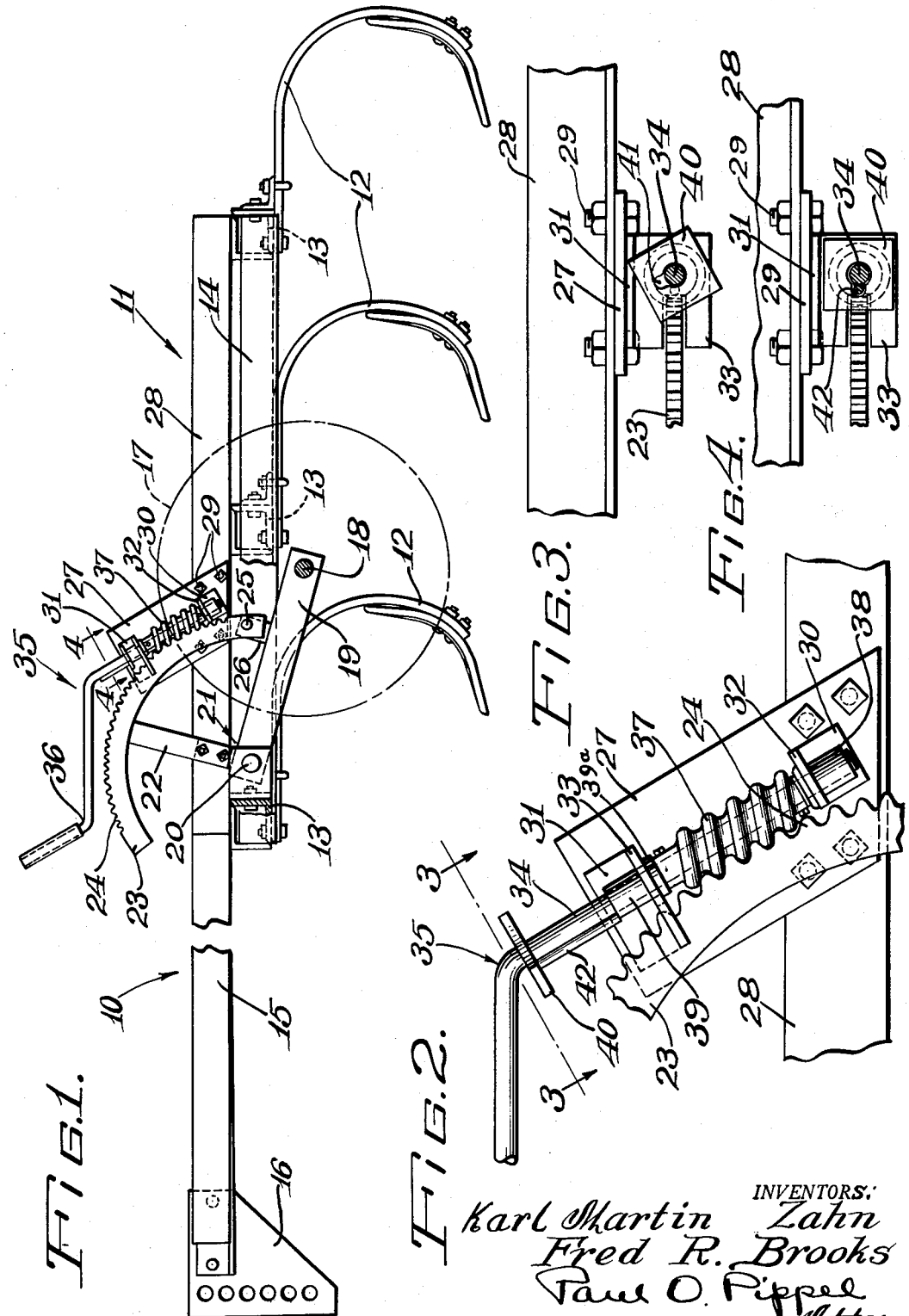

2,753,735
STUBBLE MULCH CULTIVATOR LIFT LOCK

Karl Martin Zahn and Fred R. Brooks, Stockton, Calif., assignors to International Harvester Company, a corporation of New Jersey Application July 14, 1952, Serial No. 298,672

5 Claims. (Cl. 74—527)

This invention relates to agricultural implements and particularly to an implement of the trail-behind type. More specifically the invention concerns an improved lifting mechanism for a trail-behind implement.

The implement with which this invention is particularly concerned is of the type known as a field cultivator particularly useful in stubble mulch operation. This type of implement is very large and heavy and must necessarily be of very rugged construction while the depth adjusting mechanism therefor must be capable of fine increments of adjustment to secure the proper depth of operation of the earth penetrating tools. An implement of this type is customarily mounted upon ground wheels which support the tool-carrying frame, and lifting as well as depth adjustment are accomplished by moving the wheel in a vertical plane relative to the tool frame between operating and transport positions. In an implement of this type it is important that the depth adjusting mechanism be of rugged construction and the principal object of the present invention is the provision in an agricultural implement of the wheel supported type, improved lifting and adjusting mechanism for regulating the depth of operation of the earth penetrating tools and for vertical moving of the implement between operating and transport positions.

Another object of the invention is the provision in a field implement of the type referred to, of novel depth adjusting mechanism for the earth penetrating tools which includes gearing affording small increments of adjustment.

Another object of the invention is the provision in a wheeled implement of the type referred to of improved lifting and adjusting mechanism wherein a toothed quadrant is incorporated with the supporting arm for the ground-engaging wheel, the entire assembly is raised and lowered by engagement of the quadrant teeth with a gear carried by the frame and locking means hold the parts in selected position.

Other objects and advantages of the invention will become clear from the following detailed description when read in conjunction with the accompanying drawings wherein:

Fig. 1 is a view in side elevation, partly in section, of a field cultivator incorporating the features of this invention;

Fig. 2 is an enlarged detail of a portion of the depth adjusting mechanism shown in Fig. 1;

Fig. 3 is a sectional view taken on the line 3—3 of Fig. 2; and

Fig. 4 is a sectional view taken on the line 4—4 of Fig. 1.

Referring particularly to the drawings, it will be observed that the stubble mulch cultivator with which this invention is concerned is designated generally by the numeral 10 and is shown only in side elevation thereof. It may be understood that the implement frame 11 is generally rectangular and extends transversely of the direction of travel thereof and that a plurality of the earth working tools 12 are mounted thereon at laterally and longitudinally spaced locations. It may also be understood that the frame 11 comprises three longitudinally spaced angle bars 13 which extend transversely of the direction of travel and are connected at each end by longitudinally extending side bars 14, only one of which is shown. Also suitably secured to the frame 11 is a hitch structure 15 which projects forwardly from the main body of the implement and is provided with an attaching plate 16 for connection of the implement to a draft source such as a tractor.

The implement frame and the earth working tools carried thereby are supported on a pair of laterally spaced ground-engaging wheels, only one of which is shown in dotted lines in Fig. 1 and designated by the numeral 17. Each wheel 17 is mounted upon a stub axle 18 which is secured to the end of a rearwardly and downwardly extending arm 19, the forward end of which is pivotally mounted upon a shaft 20 rockably mounted in the frame. Arm 19 forms one arm of a bell crank designated by the numeral 21 and having another arm 22 having secured thereto at its end a quadrant 23 having teeth 24 about the periphery thereof. One end of the quadrant is connected by a bolt 25 with a lug 26 affixed to the arm 19, and it may be understood that the toothed portion of the quadrant defines an arc substantially about the axis or fulcrum 20 of the bell crank. It should now be clear that by virtue of the pivotal mounting of the bell crank 21 upon the shaft 20 on the frame, that the wheel 17 is capable of swinging movement in a vertical plane about its pivot axis on the frame, and that such vertical movement of the ground-engaging wheel effects raising or lowering of the tool-supporting frame.

Vertical swinging of the wheel 17 relative to the tool-carrying implement frame is accomplished by mechanism including a bracket 27 affixed to a bracing bar 28, one or more of which is provided on the implement frame by a plurality of bolts 29. Bracket 27 extends upwardly from the frame and forwardly at an angle, and has secured thereto at spaced locations angle members 30 and 31 provided with laterally extending flanges 32 and 33 respectively. Flanges 32 and 33 are apertured for the reception of the shank 34 of a rotatable shaft 35 having a hand crank portion 36. Between the flanges 32 and 33 a worm gear 37 is secured to the shaft and the shaft is further held against displacement from the flanges by the provision of bearing collars 38 and 39. End thrust is taken by a thrust bearing 39a against which the upper end of the worm 37 abuts.

It will be observed that the shank of crank 35 is tangent to the quadrant 23 and that the worm gear 37 is in mesh with the teeth 24 of the quadrant throughout its range of movement about the axis 20. Rotation of the crank 35 therefore operates the worm 37 and actuates the quadrant 23 and the bell crank 21 to swing the wheel-carrying arm 19 to raise and lower the frame.

In order that rapid adjustment of the operating depth of the implement as well as fine increments of adjustment may be obtained, the thread pitch of the worm 37 is relatively sharp, increasing the likelihood of slippage occurring between the worm and the teeth of the quadrant during operation and particularly in transport over rough ground. Novel means are therefore provided for preventing this creeping of the gears and this is accomplished by mechanism now to be described.

It will be observed particularly well in Figs. 2, 3 and 4 that the crank 35 has mounted thereon a locking element in the form of a movable plate member 40 provided with a keyhole slot 41. It will also be noted that the upper portion of the shank 34 of the crank 35 is deformed to the extent of having an additional cylindrical rod-like member 42 affixed thereto as by welding for reception in the restricted end of keyhole slot 41. As indicated in Fig. 4 this portion of the crankshaft is slidably receivable in the opening in the plate 40 and when this portion of the crank is received in the opening in the plate the latter cannot be rotated relative thereto. As is clear from Figs. 3 and 4, plate 40 is square and when slid down over the deformed portion of the shank from the position shown in Fig. 2 to that shown in Fig. 1 with one edge of the plate adjacent the angle member 31, the plate 40 is held against rotation and likewise the crank 35 is held against rotation. The crank and the worm 37 are thus locked in place with respect to the quadrant 23 and the ground-engaging wheel 17 is therefore held in its selected adjusted position.

When the operator desires to turn the crank 35 and the worm 37 to adjust the depth of operation of the implement or to move it between an operating and transport position he slides the plate 40 upwardly on the shank 34 of the crank 35 until it passes the upper end of the projection 42 on the shank. It is then turned to the position shown in Fig. 3 so that it will not slide back upon the crank into a locked position during the operation of the crank. It will also be observed that when the plate 40 is in the operating position indicated in Figs. 1 and 4 it rests upon the upper edge of the collar 39 and is held there with the edge of the plate closely adjacent the angle member 31.

It is believed that the operation of the lifting mechanism of this invention will be clearly understood from the foregoing description. It should likewise be understood, however, that the invention has been described in its preferred embodiment only and that modifications may be made therein without departing from the spirit thereof or the scope of the appended claims.

What is claimed is:

1. For use in connection with lifting mechanism for an implement having a frame and a part movable relative thereto, wherein a rotatable gear-carrying shaft on the frame is operatively engageable with a gear on the movable part to move the latter in response to rotation of the shaft: locking means for holding the shaft against rotation comprising a plate, a keyhole slot formed in said plate, said shaft having a deformed portion conforming to the shape of said slot for slidable and non-rotatable reception therein, said plate being slidable on the shaft from an operative position on the deformed portion thereof and in engagement with said frame to an inoperative position out of engagement with the frame to permit turning the shaft.

2. For use in connection with lifting mechanism for an implement having a frame and a part movable relative thereto, wherein a rotatable gear-carrying shaft on the frame is operatively engageable with a gear on the movable part: locking means for holding the shaft against rotation comprising a locking member having a keyhole slot formed therein adapted to slidably receive said shaft and said shaft having a portion thereof shaped to conform to the shape of said slot, a part on said frame cooperably engageable with said locking member to prevent rotation of said shaft, said locking member being slidable on the shaft to an inoperative position out of engagement with said frame part to permit turning of the crank.

3. For use in connection with lifting mechanism for an implement having a frame and a part movable relative thereto, wherein a rotatable gear-carrying shaft on the frame is operatively engageable with a gear on the movable part: locking means for holding the shaft against rotation comprising a deformed portion on said shaft adjacent the frame, a locking member having an opening slidably and non-rotatably receiving the deformed portion of said shaft and cooperably engageable with the frame to prevent rotation of the shaft and worm, said locking member being slidable on the shaft to a position out of engagement with said frame to permit rotation of the shaft.

4. For use in power transmission mechanism wherein a part is mounted on a support for movement relative thereto to selected positions and a rotatable gear-carrying shaft is mounted on the support for operative engagement with a gear on the movable part: locking mechanism for the gears to hold them in engagement in a selected position of the part relative to the support, comprising a bracket on the support, means on the bracket for rotatably supporting the gear-carrying shaft, said shaft having a deformed portion, a locking element having an opening therein to slidably and rotatably receive the shaft and conforming to said deformed portion, said element being non-rotatable relative to the shaft when said deformed portion is received in the opening therein, and said element being slidable on the shaft to and from a position in locking engagement with said bracket to prevent rotation of the element and the shaft relative to the support.

5. The invention as set forth in claim 4, wherein the opening in the locking element is in the shape of a keyhole slot and the deformed portion of the shaft is in the shape of a key to fit the slot.

References Cited in the file of this patent

UNITED STATES PATENTS

| | | |
|---|---|---|
| 550,651 | Sommerfeld | Dec. 3, 1895 |
| 590,940 | Ayer | Sept. 28, 1897 |
| 915,492 | Sickler | Mar. 16, 1909 |
| 927,887 | Sickler | July 13, 1909 |
| 975,295 | Sickler | Nov. 8, 1910 |
| 1,121,750 | Miller | Dec. 22, 1914 |
| 2,432,574 | Josefrak | Dec. 16, 1947 |
| 2,602,349 | Manning | July 8, 1952 |
| 2,653,488 | Wallace | Sept. 29, 1953 |